US007543299B2

(12) United States Patent
Goodman et al.

(10) Patent No.: US 7,543,299 B2
(45) Date of Patent: Jun. 2, 2009

(54) CREATING WEB SERVICES PROGRAMS FROM OTHER WEB SERVICES PROGRAMS

(75) Inventors: Brian D. Goodman, New York, NY (US); James K. Kebinger, Hamden, CT (US); Konrad C. Lagarde, Milford, CT (US); Richard M. Rogers, Raleigh, NC (US); Chen Shu, Oakville, CT (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 10/679,759

(22) Filed: Oct. 6, 2003

(65) Prior Publication Data

US 2004/0199896 A1 Oct. 7, 2004

Related U.S. Application Data

(63) Continuation of application No. 10/406,378, filed on Apr. 2, 2003, now abandoned.

(51) Int. Cl.
*G06F 9/46* (2006.01)
*G06F 15/16* (2006.01)

(52) U.S. Cl. .................... 719/311; 709/218

(58) Field of Classification Search ............. 719/311; 709/218
See application file for complete search history.

(56) References Cited

U.S. PATENT DOCUMENTS

| | | |
|---|---|---|
| 5,701,451 A | 12/1997 | Rogers et al. |
| 5,721,908 A | 2/1998 | Lagarde et al. |
| 5,745,754 A | 4/1998 | Lagarde et al. |
| 5,752,246 A | 5/1998 | Rogers et al. |
| 5,761,663 A | 6/1998 | Lagarde et al. |
| 5,793,964 A | 8/1998 | Rogers et al. |
| 5,850,548 A | 12/1998 | Williams |
| 6,094,655 A | 7/2000 | Rogers et al. |
| 6,125,400 A | 9/2000 | Cohen et al. ............... 709/247 |
| 6,144,955 A | 11/2000 | Tsuiki et al. |
| 6,157,960 A | 12/2000 | Kaminsky et al. ........... 709/303 |
| 6,336,118 B1 | 1/2002 | Hammond et al. |
| 6,380,951 B1 | 4/2002 | Petchenkine et al. |

(Continued)

FOREIGN PATENT DOCUMENTS

CA    2376038 A1 *  9/2003

(Continued)

OTHER PUBLICATIONS

Web Service Capsule Building, Hosting, Bridging Web Service Capsules: In More Detail Inventos: Konrad Lagarde, James Kebinger, Chen Shu, Richard Rogers IBM Confidential pp. 1-2 Apr. 24, 2002.

(Continued)

*Primary Examiner*—Li B Zhen
*Assistant Examiner*—Abdou K Seye
(74) *Attorney, Agent, or Firm*—John E. Campbell

(57) ABSTRACT

A computer program capsule is created from programs that include at least one other web service program. The programs are interconnected and saved as an encapsulated program for use as an encapsulated program or a web service program. The encapsulated program is created and interconnected from a local or remote computer.

14 Claims, 18 Drawing Sheets

PARALLEL EXECUTION MULTIPLE RECORDS (EACH SERVICE ON DIFFERENT COMPUTERS)

U.S. PATENT DOCUMENTS

| | | | |
|---|---|---|---|
| 6,633,888 | B1 | 10/2003 | Kobayashi et al. |
| 6,792,605 | B1* | 9/2004 | Roberts et al. ............... 719/313 |
| 2002/0184402 | A1 | 12/2002 | Gangopadhyay ............ 709/315 |
| 2002/0184610 | A1 | 12/2002 | Chong et al. ................. 717/109 |
| 2003/0004746 | A1 | 1/2003 | Kheirolomoom et al. |
| 2003/0035006 | A1 | 2/2003 | Kodosky et al. |
| 2003/0135584 | A1* | 7/2003 | Roberts et al. ............... 709/218 |
| 2004/0017392 | A1* | 1/2004 | Welch ......................... 345/738 |
| 2004/0030674 | A1* | 2/2004 | Nagano et al. .................. 707/1 |
| 2004/0064529 | A1* | 4/2004 | Meredith et al. ............ 709/219 |
| 2005/0091087 | A1* | 4/2005 | Smith et al. ..................... 705/5 |

FOREIGN PATENT DOCUMENTS

| | | |
|---|---|---|
| WO | WO 0058873 | 10/2000 |
| WO | WO 0150307 | 7/2001 |

OTHER PUBLICATIONS

Understanding WSDL in a UDDI registry, Part 1 How to Publish and find WSDL service descriptions developer Works: Web Services: Understanding WSDL in a UDDI registry Part 1 wysiwyg://43/http://www-106.ibm.com/developerworks/webdservices/library/we-wsdl/ Apr. 18, 2002.

INSPEC Integrating groupware and workflow in a public administration. J Ziegler T Barnekow 1997.

WSFL Web Services Flow Language http://www.ebpml.org/wsfl.htm Aug. 7, 2002.

Technologies for E-Services, International Workshop 3rd, Hong Kiong, Aug. 23-24, 2002, TES 2002 Proceedings, pp. 48-53.

04 721 231.1 - 1243, POU920020082EP1 May 31, 2007, Communication pursuant to Article 96(2) EPC, Litherland, David Peter, 5 pages.

International Search Report, Mailing Date Oct. 5, 2005 Filing Date Mar. 17, 2004, POU20082 PCT/GB2004/001130, IBM United Kingdom Limited IP Law David Peter Litherland, 9 pages.

* cited by examiner

CREATING WEB SERVICES PROGRAMS FROM OTHER WEB SERVICES PROGRAMS

The invention disclosed in this application is a continuation of application Ser. No. 10/406,378 "PROGRAM CREATION BY COMBINING WEB SERVICES USING GRAPHIC USER INTERFACE CONTROLS" filed on Apr. 2, 2003, now abandoned. The disclosure of the forgoing application is incorporated herein by reference.

FIELD OF THE INVENTION

The present invention is related to programming on the World Wide Web. It is more particularly related to combining web program objects (Web Services) to create a new web program object.

BACKGROUND OF THE INVENTION

The World Wide Web (The Web) is a popular computer networking platform today with millions of people daily using it for a wide variety of applications from personal e-mail and research "web surfing" to highly sophisticated business and scientific uses. The web was developed to make use of the Internet simple and easy to use. The concept was to provide Browser programs at user (client) personal computers (PCs) to interpret information from host servers using HyperText Markup Language (HTML) and graphic files. The Internet provided the communication means to interconnect web clients and servers.

Web services are programs that are accessible by a server and perform a function for the client community. A web service, in one example, provides stock ticker information. A client, knowing that a web service is available, can access the web service to accomplish an operation for which the client would otherwise have to create a program. With the availability of the web service, the client merely needs to know how to interface with the web service and he can incorporate the function of the web service into his local application.

In order for the programmer to know how to interface with the web service, he needs to understand an interfacing language. One such language is Web Service Description Language (WSDL) (according to the W3C standards found on the web at www.w3.org/TR/wsdl) which is an extensible Markup Language (XML) based language for describing the interface to a web service. A web service, operating as a content provider for a server, provides a WSDL document to client programs. The WSDL document defines interface schema such that the client knows the required format, protocol and the like for the web service interface. The client needs to understand the functionality of the web service (that it provides stock quotes and that data is encrypted for instance). Each web service defines its own terminology as well.

Web service interfacing language makes it much easier for a programmer to write code to incorporate the functionality of a web service into a custom program, however, programming knowledge (WSDL, XML, HTML etc.) is required to do this.

SUMMARY OF THE INVENTION

The shortcomings of the prior art are overcome and additional advantages are provided through the provision of incorporating web services using GUI tools to create a program function.

This invention is directed to simplifying program creation using web services. The present invention provides a list (menu) of web services (and optionally other programs) available to a user. A programmer uses a creator program that creates icon support for each web service that will be supported by the present invention. A menu placer function, places the created icons in a menu. Icons are also created for custom programs that are not web services. Such icons can be used to provide audio, visual, mechanical interfaces for instance. Icons are made available to a user either by an authorizing agent or by retrieving icons from a content provider. Preferably, each icon is represented by a title and supporting descriptive text. The title and optionally the descriptive text is displayed at the user's client computer with an associated general icon image. The icon comprises access to program code, web service interfacing controls, as well as visual characteristics.

The user selects an icon title and (using a UUI mover) drags it into a frame (canvas). He can then execute the icon in the frame to test its functionality. He can interconnect it (using an interconnector GUI) with other objects in the frame to create a new functionality. When the icon is dragged into the frame, preferably, a more detailed icon is created that visually depicts interfacing choices (if applicable) such that the user can select (for example) English or Spanish language conversion by selecting (using a GUI selector) the appropriate visual representation when he interconnects the object. The user can set appropriate parameters using a parameter setter GUI to customize the function of the selected Icon. The user, in one embodiment, uses a display initiator GUI to display parameter options for an Icon; then, using an operator operating on the display of parameters, the user sets the appropriate parameters; finally, the user exits the display of parameters using an exitor GUI.

In one embodiment, the user can test the functionality of the customized Icon(s). He uses an initiator GUI to initiate the test. The test is performed and results in a GUI modifier, modifying the visual presentation of the display in order to indicate the functional state of the Icon(s) according to the test functionality. The display may be altered in color, brightness, text message display, shape altering or an audio representation might be made.

In one embodiment, the interconnected Icons are saved by a representation saver as a capsule representation. The saved capsule representation is further represented by a capsule icon such that it can be added to the user's list of available icons.

When the user is satisfied with the functionality of the interconnected icons in the frame, he saves the frame structure as a named program entity. In the future, he executes the named program entity as a single object.

In one embodiment, the named program entity can itself be assigned an icon such that the named program entity can be used in the drag and drop creation of a new frame.

It is therefore an object of the present invention to provide drag and drop icons with optional visual attributes for web services.

It is another object of the present invention to provide a mechanism for interconnecting drag and drop icons to create a new function.

It is still another object of the invention to save the combined interconnected objects as a named program entity.

It is yet another object of the invention to verify the functionality of interconnected icons by performing a sample test by supplying input arguments.

It is another object of the invention to provide a visual indication of the operation of the icons when they are active in a test mode.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE PREFERED EMBODIMENTS

Figure 1:
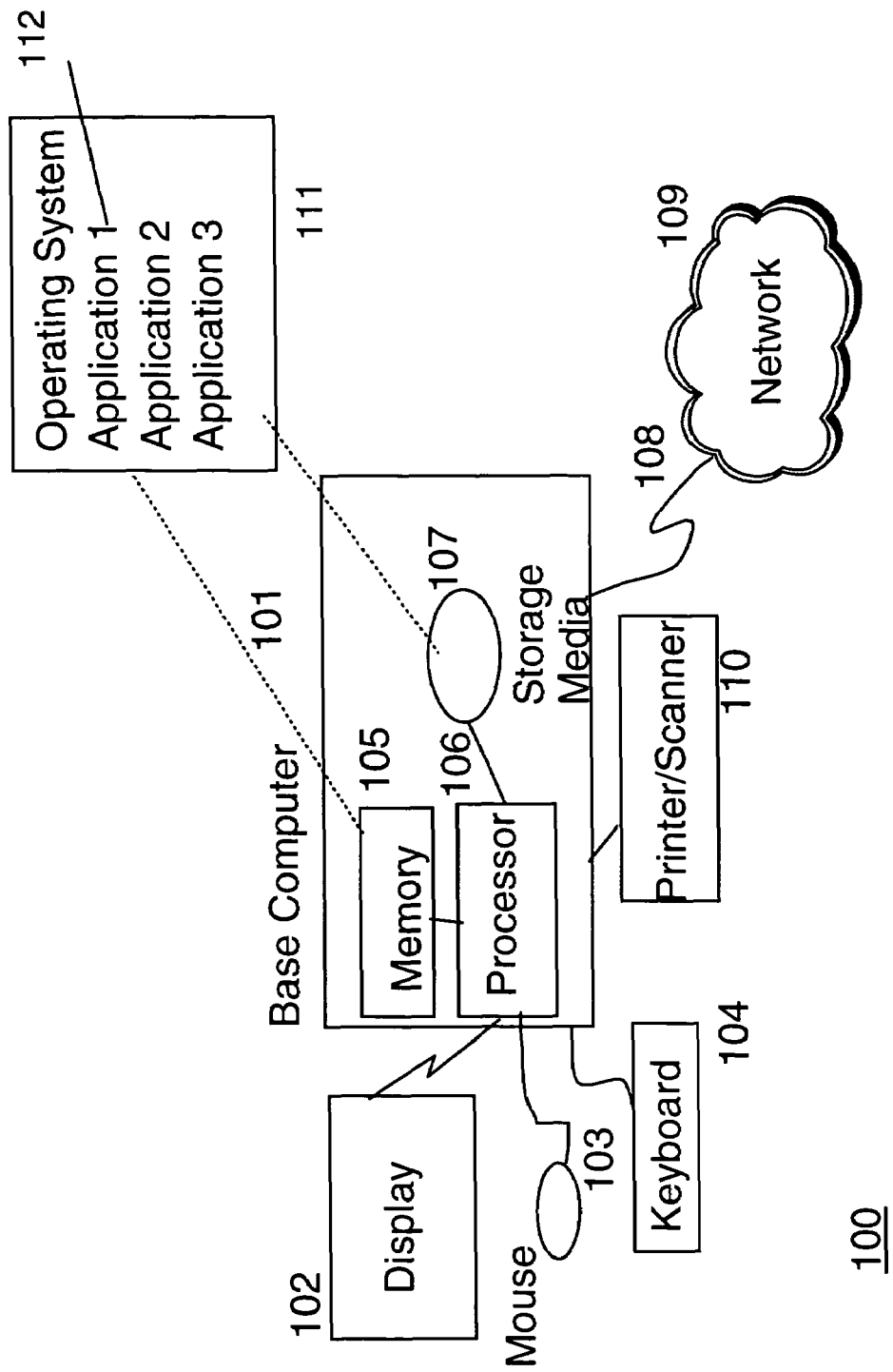
FIG. 1 is a high level depiction of a computer system for executing program applications.

FIG. 1 shows an example computer system useful for Web or Internet Peer-to-Peer network communications and executing object oriented programs such as those of the present invention. The system is comprised of a processor 106 for executing program instructions fetched from memory 105. Storage Media 107 (magnetic or optical) is used to hold programs and data that is not currently being operated on by the processor 106. The base computer optionally has peripheral devices attached to it to supply a user interface. Typically peripherals include a Display 102, Keyboard 104 and a network connection 108. Optionally, a mouse 103, printer/Scanner 110 are also connected to the example computer system. Programs 111 held in Storage Media 107 is paged into memory 105 for processor execution. Programs 111 include an operating system and applications including the applications of the present invention for example. Object oriented programs are programs that generate program objects during run time. These objects are held in memory 105 for execution by the processor.

Figure 2:
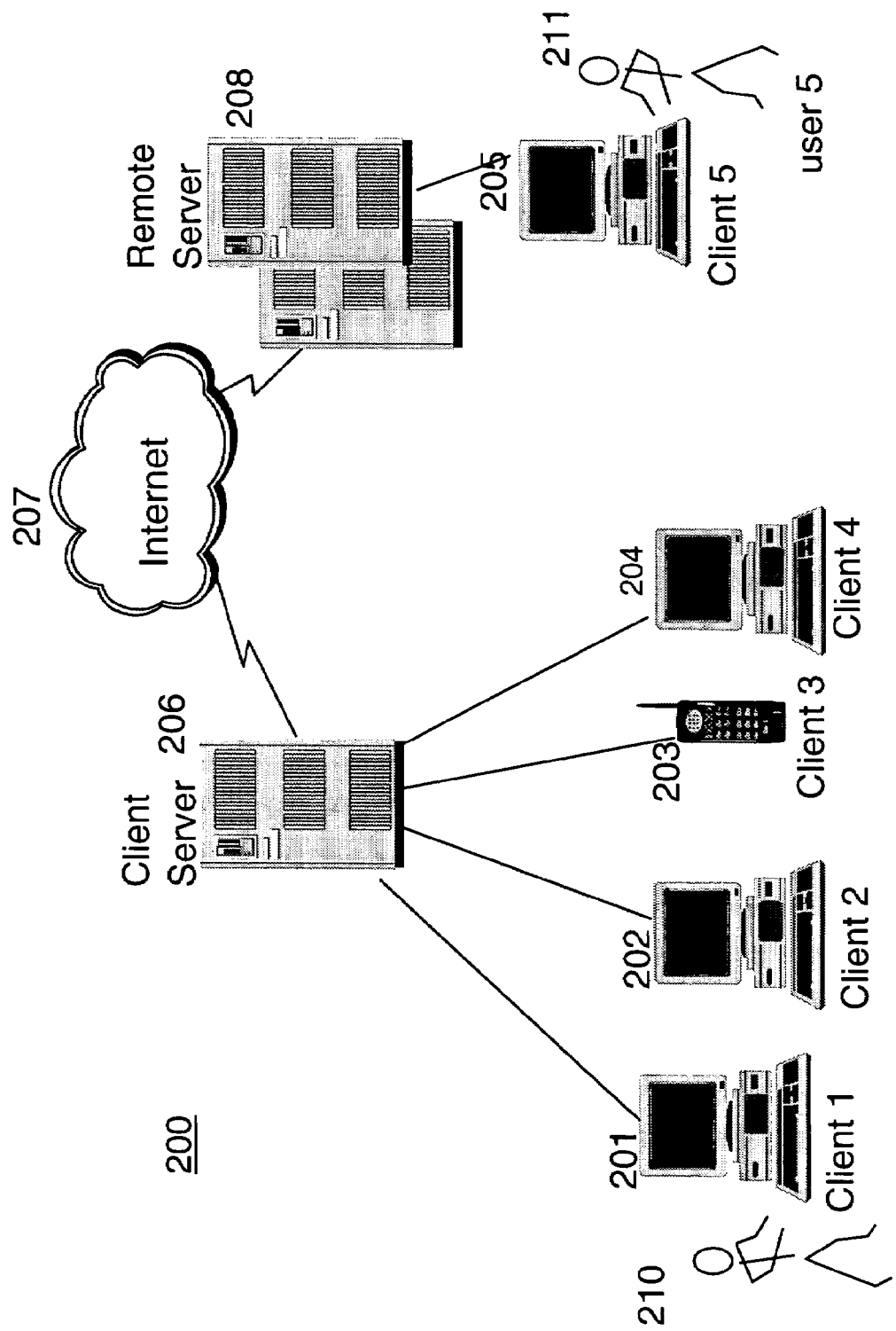
FIG. 2 is a high level depiction of a computer network employing a multiplicity of interconnected computer systems.

FIG. 2 shows a plurality of computer systems of various designs interconnected by local and Internet networks as might be used by the present invention. Client computers 201-205 directly interact with users and provide a means for requesting information. Servers 206-207 receive client requests and perform an operation in response. The operation may be simply retrieving information (HTML, GIF files comprising a web page for example), provide a path to the Internet network, or may trigger custom programs that run at the server (CGI script) or JAVA applets that run at the client computer.

Peer to Peer networks also exist wherein a computer can operate as a client and a server, enabling the computers to communicate directly.

Glossary:

UDDI (Universal Description, Discovery, and Integration) is an XML based registry of web services and business names, products and locations on the web.

WSFL (Web Services Flow Language) is XML based language designed by INTERNATIONAL BUSINESS MACHINES (IBM) for description of Web Service compositions. It relies and complements other specifications such as SOAP, WSDL, XMLP and UDDI.

SOAP (Simple Object Access Protocol) XML based protocol for exchange of information. SOAP comprises an envelope that defines a framework for describing a message and how to process it, encoding rules and convention for representing remote procedures.

XMLP is the formal set of conventions controlling format and processing of XMLP messages and application interaction.

IDS (Intelligent Decision Server) also DIS (Distributed Integration Solution) U.S. Pat. No. 6,094,655 (Rogers et al.) "Method of creating and using Notes decision capsules" assigned to IBM. IDS and incorporated herein by reference, executes selected program capsules which are strung together capsule elements.

Web Services are applications normally available from a remote server by way of the World Wide Web. Web services preferably describe themselves using WSDL (an XML based document that describes the interface of the web service). A directory (conceptually equivalent to a telephone directory for phones) is provided so users can find available services, preferably UDDI. A means for communication between the web service and its clients is also provided, preferably SOAP.

With the emergence of web services on the Internet, building new applications using these services becomes a new way of developing applications. Often, web services are developed by independent groups and combining these services together in meaningful ways is not easily accomplished. Our invention allows non-developers a way of creating, combining, packaging, and using these services together in an "encapsulated" process flow. We provide a means for combining and encapsulating web services that may have never been intended to work together.

We provide a way to define the linkage between web services, and build combinations of (web) services workflows. These combined by linkage services are called capsules (a sequence of web services connected together in a process flow). In our approach output from a web service are taken as is, and used as input to another web service (or set of web services in parallel). Or, optionally, output from a web service is converted or transformed before being used as input to another web service(s). The transformers are the function of local services (part of a tool set) or, in another embodiment, the transformation is performed by transformer web services. These combinations of web services, or encapsulated process flows (capsules), are built by users (using our tool) who are not required to have programmer skills using the "Visual Flow Builder" (Capsule for Web Services). The tool in one embodiment has UDDI integration, so that users can access any web service on the Internet and incorporate the service into their capsules. The capsules are then saved with all attributes for later use. The saved capsule is either retrieved and executed from within the tool, or exported as a web service to be made available to other applications (via UDDI for example). Execution within the tool is useful for debugging purposes as well. The tool provides informational feedback to the user when executing a flow. For example, as a capsule executes, the flow of events from web service to transformer to web service is depicted by highlighting the currently executing web service. In one embodiment, the visual icon representing the web service that is executing is green when it is executing, white when it is idle and red when it has detected an error.

The present invention provides a non-programmatic means for web services to be combined (encapsulated) to develop process workflows that can be partial or complete applications, or "super" services (a combination of web services that can then be offered as a web service).

The present invention provides a method for defining these combinations of services (capsules), so that they can be created, viewed and modified. (Visual Flow Builder).

The present invention provides a method for saving and retrieving these capsules for modification, distribution (e.g. to a UDDI registry or a web application or product), and/or execution (with debugging capability).

The present invention provides a method for executing the process workflows (capsules) with visual feedback over the Internet (or Internet) or a combination of environments.

A system creates the web service icon in the following way. Based on the analysis of the WSDL of a web service, a system knows the signature and the return type of the method(s) of a web service. The system then creates the text/icon representation of the method. In one embodiment, each method is a box with several rows. First row is the name of the web service, second row is the name and return type of the method, third row and rest (if exist) represent the input parameter types.

Creating Local Web Service Directory:

The web service capsule builder provides three methods for cataloging available web services. The first is by querying a UDDI server (the de facto directory for web services). The second is via the file system using an XML based document. The third is by manually adding a service to the local catalog by entering all aspects of the service in the visual WSDL creator. Either way, building a service capsule is done by first gathering all the services needed to build the desired flow. The left pane 302 of the service capsule builder 301 is a WSDL browser, providing a generic interface for viewing services and the methods/functionality available from those services.

The local list of available web services 302 can be created by a method known in the art. The list can be created manually by selection from a central list available from a web site for instance. The list can be provided in a hierarchical grouping for ease of navigation.

Figure 4:
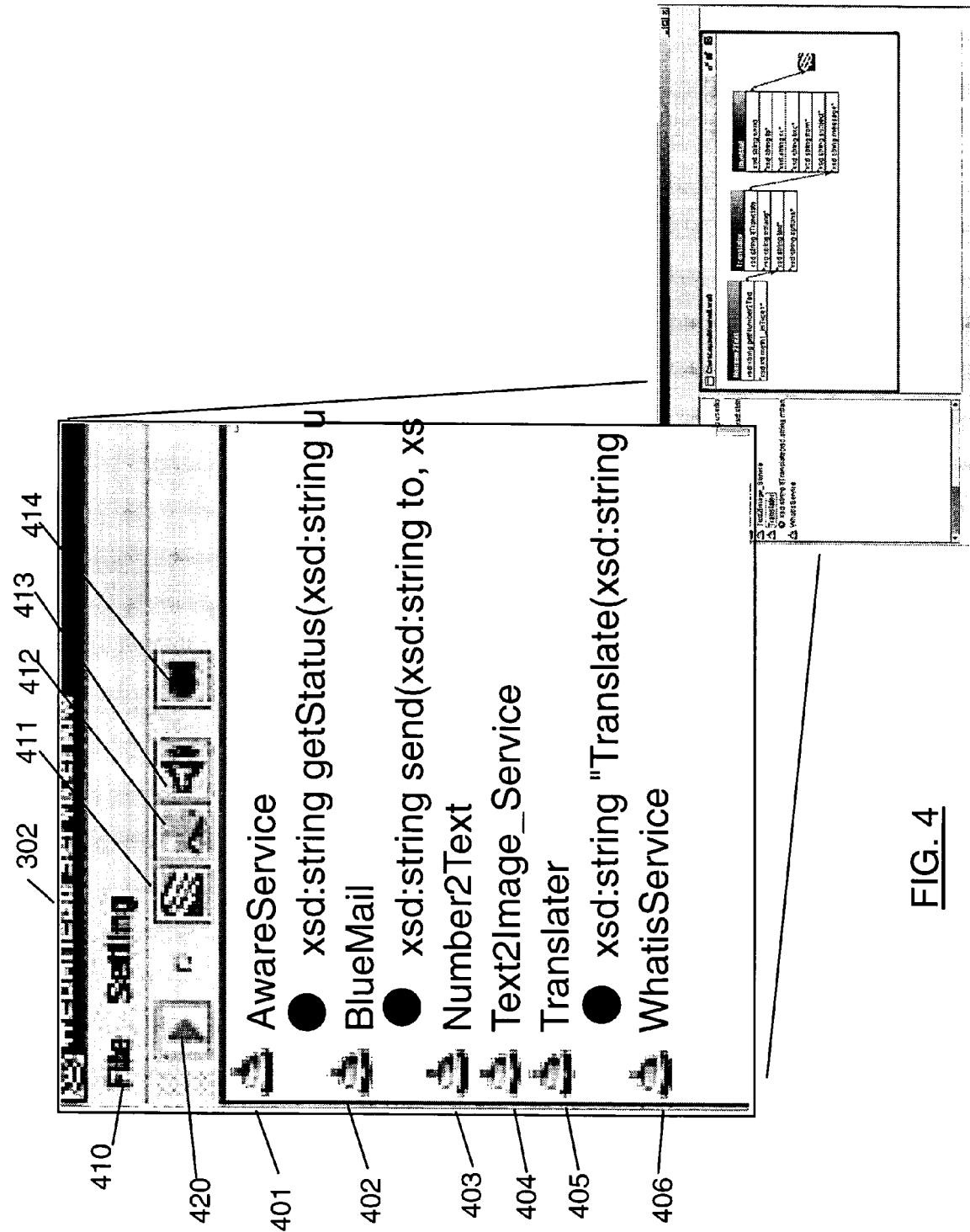
FIG. 4 expands a portion of FIG. 3 to depict a list of icons.

In one embodiment, referring to FIG. 4, a custom web service capsule browser tool queries a local file directory or a remote site via HTTP or FTP or UDDI for the available WSDL documents, analyzes them based on user input criteria and creates the list 302 of web service icons that represents the web services 401-406. Each web service (BlueMail in 402 for example) may have one or more than one method exposed which is represented as a method icon shown as the child node of the web services (for BlueMail 402, "* xsd:string send . . . "). For example, the user selects File/Import WSDL from a menu in the custom web service browser, and browses to a file directory and selects the Number2Text.wsdl. The system then reads that WSDL, analyzes it and creates a Number2Text web service node with getNumber2Text method as its child node. Number2Text web service node is represented by a web service icon (bell) and the getNumber2Text method is represented by a web service method icon (ball or *) 302.

Building a Capsule:

Given a populated service listing 302, capsule construction can commence. Creating a new web service capsule 303 does two things. First, it provides the space (referred to as capsule canvas) within which individual services are arranged, chained, viewed or tested and second, it acts as the named container for the service. The capsule itself 303 represents a single service even though multiple web services may be used to define a capsule. So, by creating a capsule 303 we create a web service whose function is the flow of services 501-503 it contains.

Figure 5:
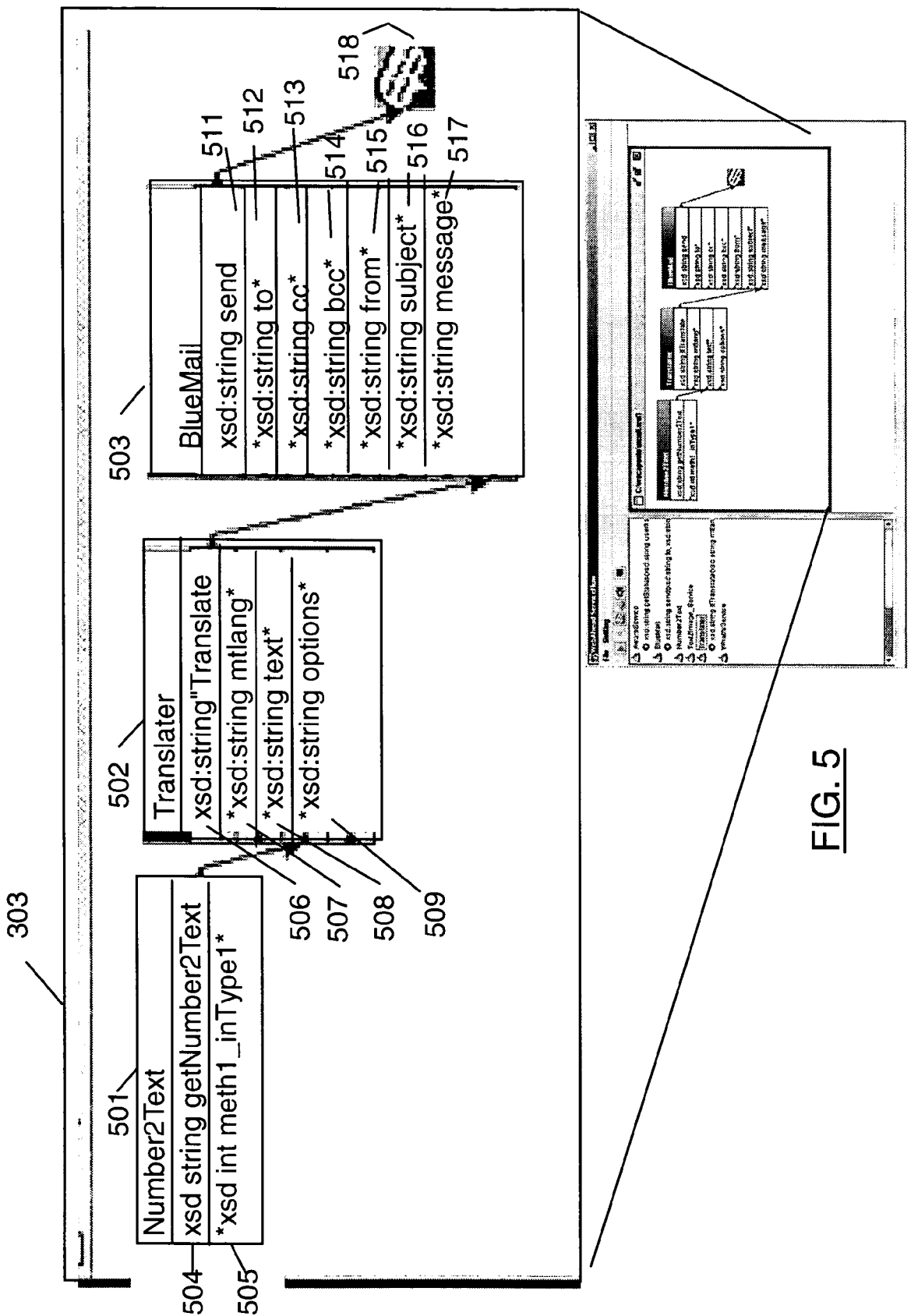
FIG. 5 expands a portion of FIG. 3 to depict interconnected icons dragged from the list of FIG. 4.

Referring to FIG. 5, after a web service icon is dragged and dropped into the flow construction area for the new capsule 303, preferably a more detailed icon is created preferably comprising two or more rows. Each row provides a GUI means for selecting an option for the web service. Options can include parameter selection, personalization of text, or alternative interconnect contact points for interconnecting more than one input or output to the web service icon. For example, the "Translator" web service 502 has five rows. The first row is the name of the web service, "Translator" in this case. The second row 506 is the name of the method, "Translate" in this case, and the return type, "xsd:string" in this case. Row three 507 to row five 509 is the method signature, "xsd:string mtlang 507, xsd:string text 508, xsd:string option" 509 in this case. "Xsd:string" is the type of the input parameter. Mtlang 507 is the language to translate to. Text is the text 508 to translate. Options 509 is the format of the output, either text or HTML. To invoke this web service for translating text from English to Spanish, for example, the user needs to right click on the third row 507 which produces a pop-up window (not shown). The user then sets mtlang to Spanish in the pop-up window. Next the user right click on the fourth row 508 and sets text to the word/sentence that he/she wants. Finally, the user right clicks on the fifth row 509 to set the options to "text", "HTML" or leave it as blank.

It should be understood that XSD is a XML prefix to denote the XML Schema namespace "www.w3.org/2001/XMLSchema" and it conforms to XML schema convention. "xsd:item" such as xsd:string is used to identify the type of input parameter or type of the return method.

After the user has dragged and dropped web services into the flow pane (canvas), connected them and set the needed input parameters, a capsule is created. Behind the scene, a graph data structure that represents the web services objects and the interactions between the web services is also created. When the user selects Save or Save As from the File menu, the graph data structure is saved to the hard drive as WSFL using Java Object Serialization. In one embodiment, the saved capsule can be added to the users' web services menu 302.

Dragging and dropping a web service 401-406 from the service list 302 to the capsule canvas 303 visually instantiates the resource and in a preferred embodiment creates a detailed icon for the web service. It is represented with the name of the service, the function being used from that service 504-517 and the inputs and outputs required for the service to function. In this example we have dragged the "Number2Text" service 501 to the capsule canvas 303. This service takes a number and spells out that number in English. (e.g. input "1" becomes output "one") We initialized Number2Text 501 with a number, in this case, the number 1. This number could also be specified if the capsule is invoked as a web service (see, Invoking/using capsules).

We then dragged the Translation service "Translator" 502, to the capsule canvas 303. We connected the Number2Text 501 output to the input of the Translator. We manually set the translator to translate for English to Spanish. If we ran the capsule, or service flow, it would call the Number2Text service 501 and it would return "one". It would pass that result to the translator service 502 and it would translate "one" to "uno". As the flow executes the current service is highlighted and the connecting arrow visually represents success and failure via red and green color. The flow from one service to another can be visually reviewed and analyzed. As capsule complexity increases this has proven to be very informative. Execution visualization can be performed in many ways familiar to one skilled in the art. Animation can be added to demonstrate the functionality under test. The visual presentation can be augmented by audio to further enhance the visualization of functionality. In the present example for instance, an animated character such as a walking human figure can carry the message from Icon to Icon while the highlighted icon or interconnection defines the item being visualized. The computer then indicates with voice messages as if the animated character were commenting such indicators as "seems fine" when things are working and "uh-oh" when a problem is suspected or even voice messages describing a possible fix "you have not told me what language to use in the 'translator' step".

Dragging the "BlueMail" service 503 (an Internet mail service) to the canvas 303, we provide a mechanism to e-mail the result of the flow to an addressee. In this case, we set the to field 512 to webahead@us.ibm.com. The from field 515 was set to Web service capsule: email-test.wsfl. The subject field 516 was set to Number2Text Translation Test. Finally we connected the output of the Translator 502 to the message input of the e-mail service 503. Running the capsule at this point does the same as before but additionally sends an e-mail of the result to webahead@us.ibm.com.

The final item we dragged to the capsule's canvas 303 is the visual alert modifier 518. The visual alert icon in one embodiment is available from the users' toolbar 411. In other embodiments, the users' browser comprises a list of local programs that can be dragged onto the canvas and added to the flow in the same manner as web services from the web services list 302. Modifiers are items that interactively change flows. In this example the alert modifier 518 simply generates an "alert" dialog with the result output of the mail service. It 518 will alert the user to the success or failure of the Internet mail operation via an alert dialog. Other modifiers might take a string and convert it to an integer. (e.g. "001" becomes 1)

Invoking/Using Capsules:

Given a completed web service capsule 303, it can be invoked in any of three ways. First it is run manually. This involves pressing a "play" button or the like. The second is invoking the capsule in a scheduled mode. For example, a service might be invoked on the hour every other hour. Third, a capsule is invoked by the SOAP server plug-in. The SOAP server plug-in provides two functions. One function is that it provides the ability to be queried as a UDDI server. When a client requests all of the open services/capsules the plug-in will return dynamically generated responses that follow the UDDI and WSDL standard. When the server is queried it will send the capsule name as the service name, the inputs as the input list determined by the first service to be called and the output as defined by the last service's output. Another function is that the SOAP plug-in acts as an interface to run capsules as if they were web services. The invocation happens when a request from an external client is made to the soap server plug-in which in turn invokes the specified capsule. It is in this way that capsules can be used as components for new capsules. Part of this invention is the IDS SOAP Bridge which provides similar functionality for IDS. IDS is a capsule based reporting environment. This IDS Soap bridge provides SOAP access to IDS. Because the bridge advertises itself as a web service, IDS capsule(s) may be integrated into capsule flows.

Figure 3:
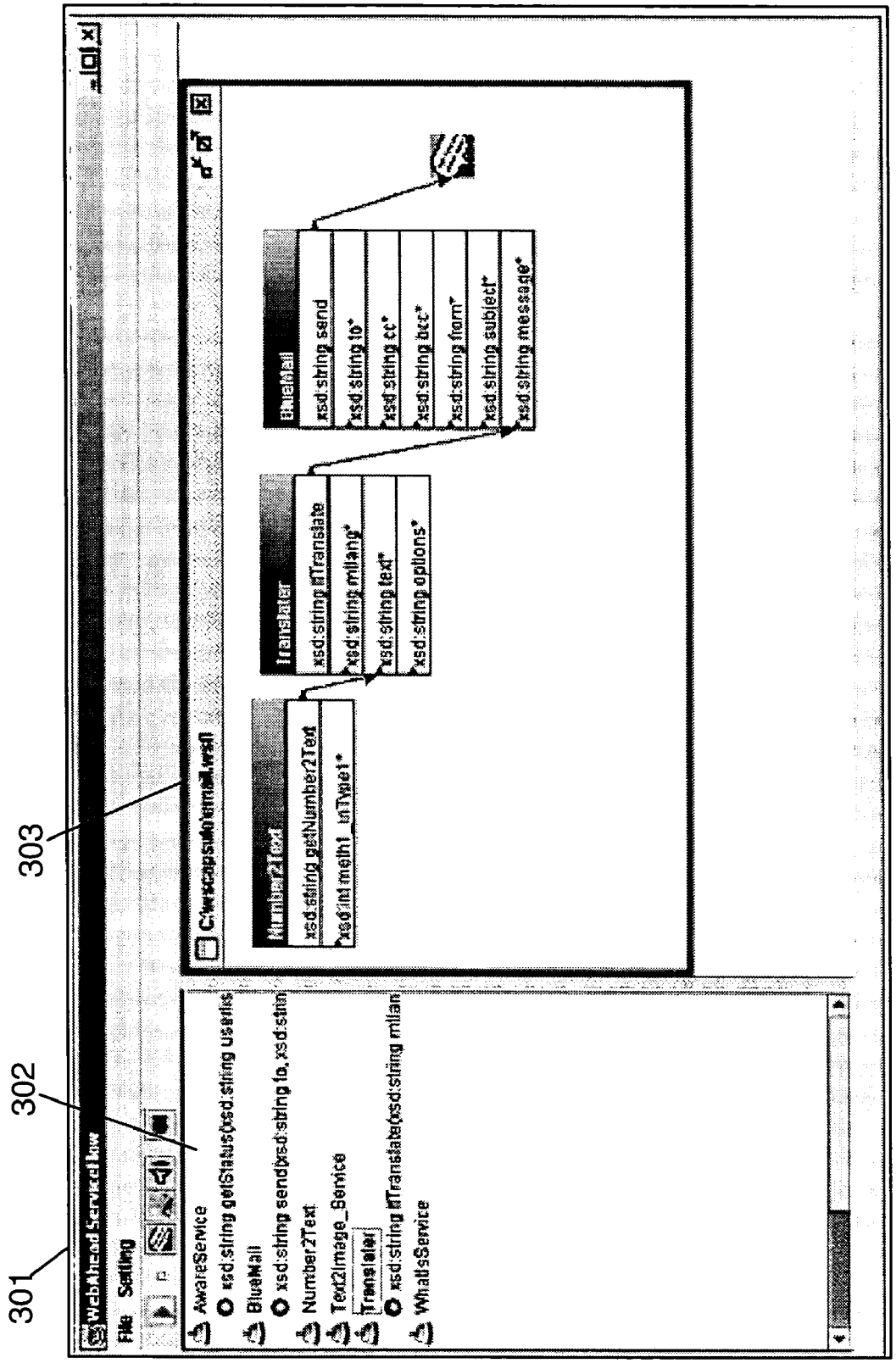
FIG. 3 is an example view of the GUI display using the present invention.

Refer to FIG. 3, Web Service capsule builder GUI 301, in the preferred embodiment comprises two frames 302 303. One frame displays the Service Listing 302 of the available services that can be used to build the new capsule. The other frame displays the capsule 303 that will contain the interconnected services from the first frame when the capsule is completed.

Refer to FIG. 4, an example of a preferred embodiment of a Service listing 302 shown. The service listing includes services 401-406 that are available for encapsulation. In one embodiment, the services include a mixture of remote services and local web services. Each service in the list that can be dragged to the container is denoted with an icon. Some of the services 401 402 405 further include additional information about the service.

Refer to FIG. 5, example Capsule 303 that has been created by the present invention is shown. Three web services 501-503 have been dropped into the capsule 303 and interconnected by the user. A local service 518 has been dropped and connected to the output of the third web service 503.

Figure 6:
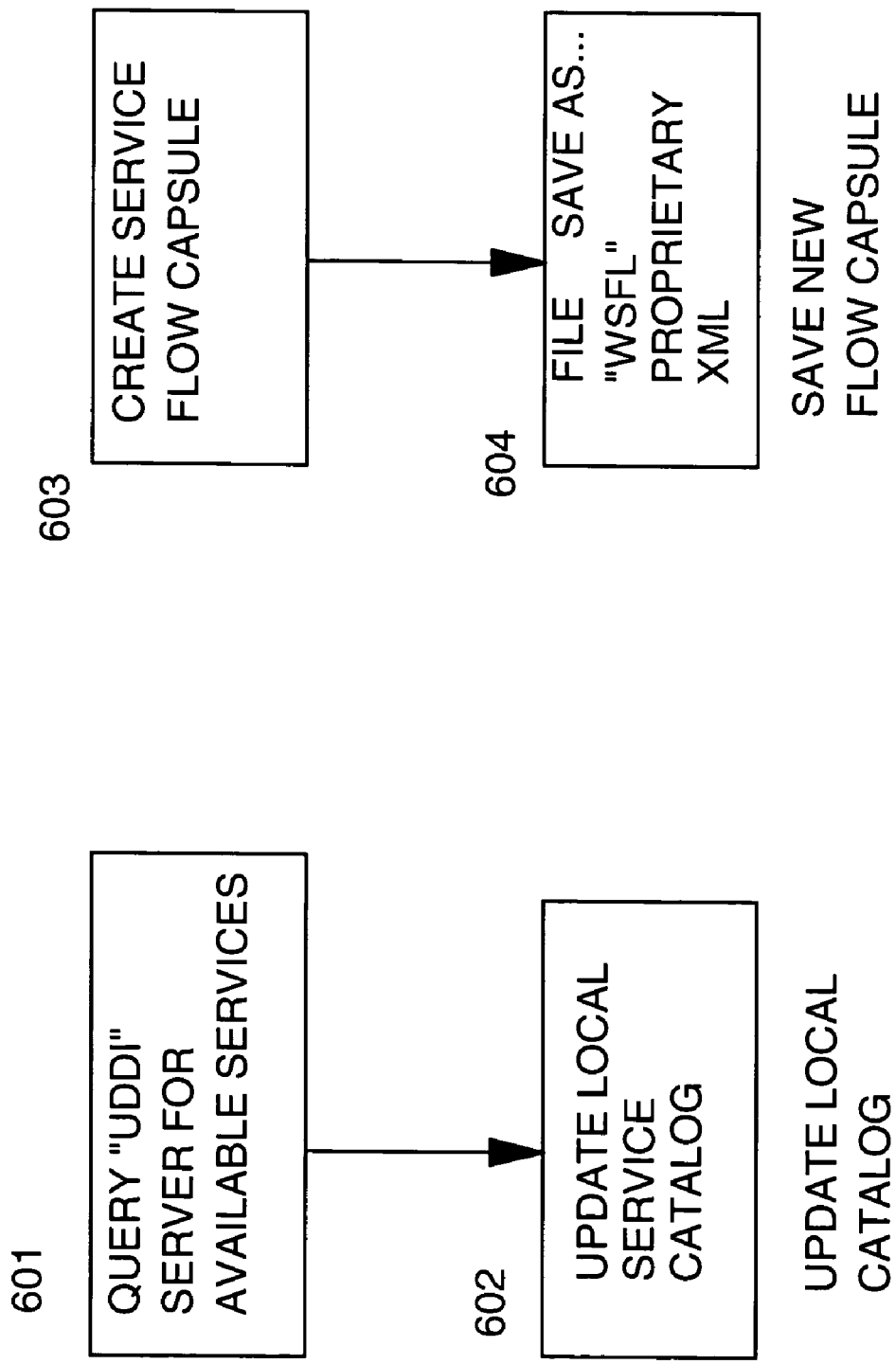
FIG. 6 shows flows for initiating and saving icons.

Refer to FIG. 6, Service Flow Initialization is portrayed. A UDDI server is queried for available services 601. The result of the query is used to update the local service catalog with candidate web service icons 602. The local service catalog is available to the user to selectively add services to the service listing 302.

Once a new service flow is created 603 in the capsule 303 it is saved in a local file 604 for future use. In the preferred embodiment the new flow is described in WSFL language which is XML based. The named capsule is optionally added to the service listing 302 as a new service flow that can be dragged to a new capsule 303.

Figure 7:
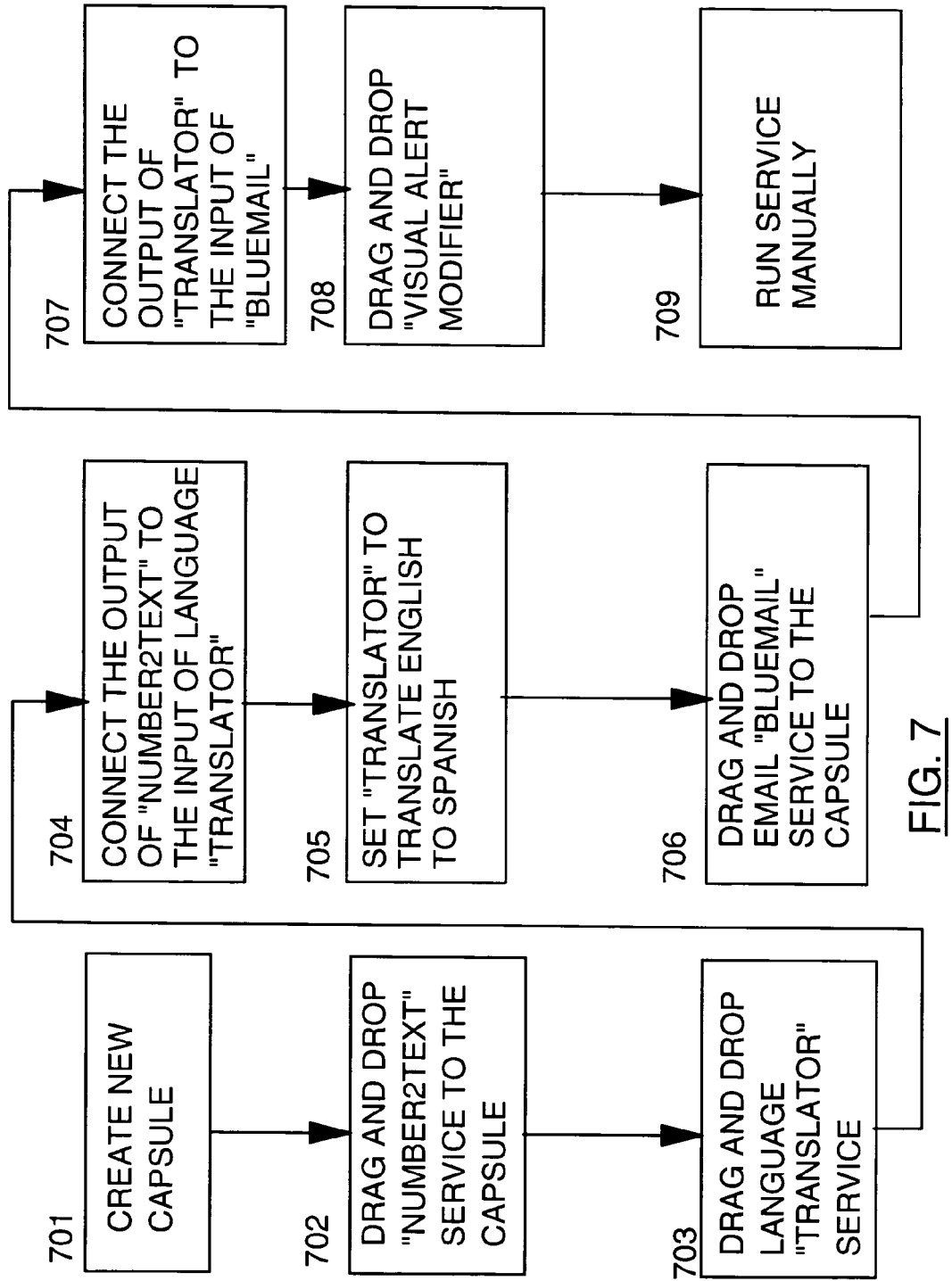
FIG. 7 shows flows for creating an interconnected group of icons.

An example of creating a Service Flow capsule is shown in FIG. 7. a new capsule 303 is opened 701 in a GUI display 301. a first service is dragged and dropped 702 to the capsule 303. A second service is dragged and dropped 703 to the capsule 303. The output of the first service is connected 704 to the input of the second service. Options for the second service are elected 705. A third service is dragged and dropped 706 to the capsule 303. The input of the third service is connected 707 to the output of the second service. A fourth service that is a local service is dropped 708 to the capsule and connected to the third service. The capsule is completed. It can be run manually 709 to verify its functionality.

Figure 8:
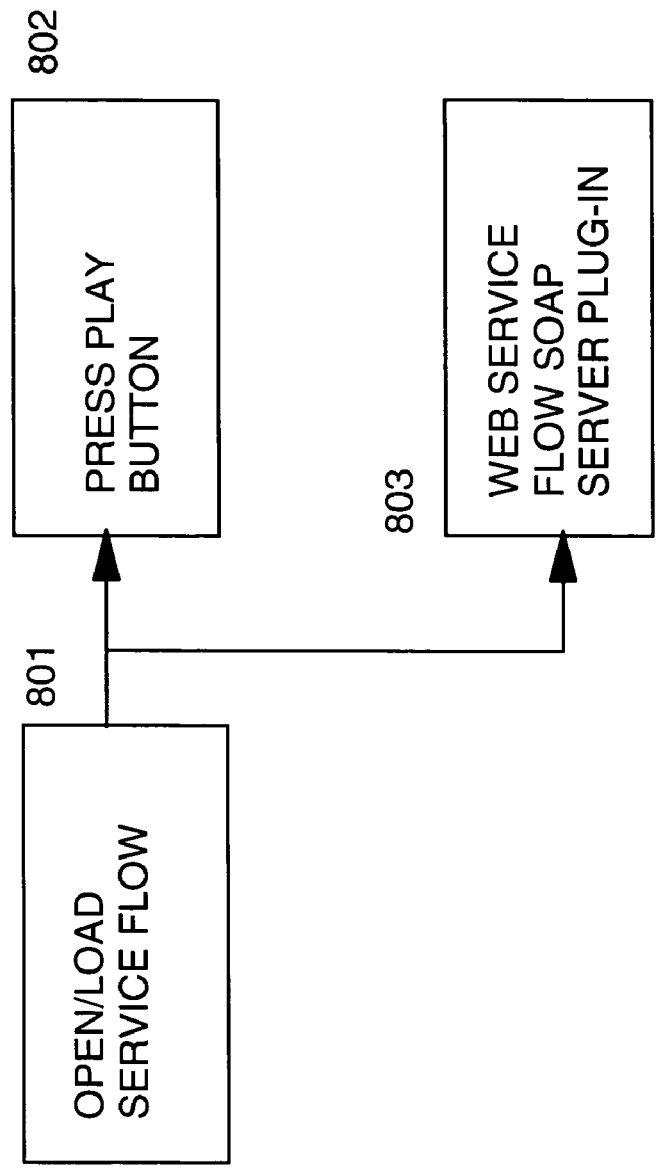
FIG. 8 depicts flows for executing an interconnected group of icons.

Executing a Service Flow is shown in FIG. 8. A service flow is opened 801 and depicted by a GUI display. The flow can be run 802 by pressing a GUI "Play" button 420 or by a SOAP server plug-in 803.

Figure 9:
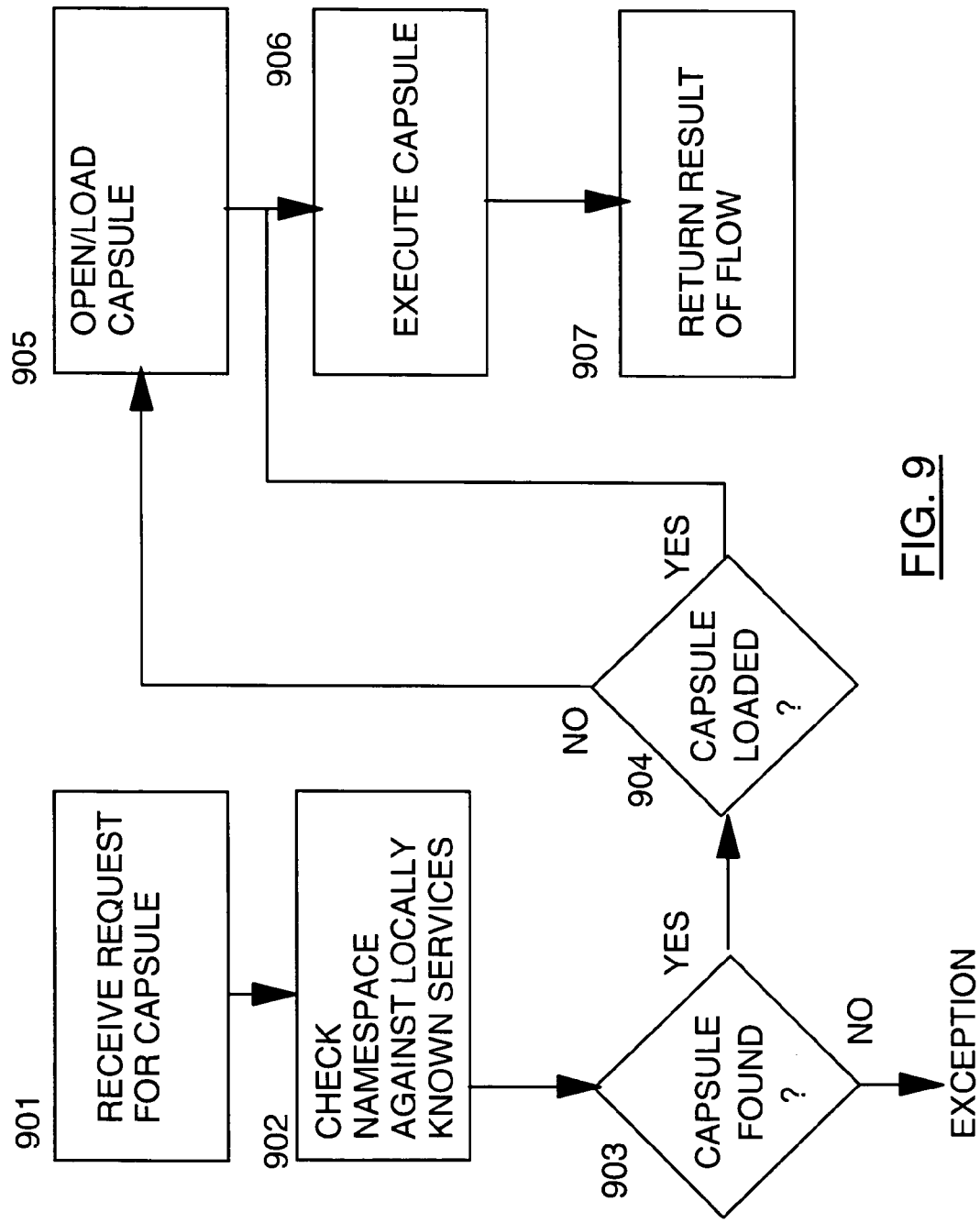
FIG. 9 depicts flows for accessing a SOAP capsule.

An example web Service Flow SOAP Server Plug-in operation is depicted in FIG. 9. A request for a capsule is received 901. The namespace is checked against locally known services 902. If no capsule is found, an exception is reported. If a capsule is found 903 and is not loaded, the capsule is loaded from its source 905. When the requested capsule is loaded, it can be executed 906 and the result of its execution is returned 907.

Figure 10:
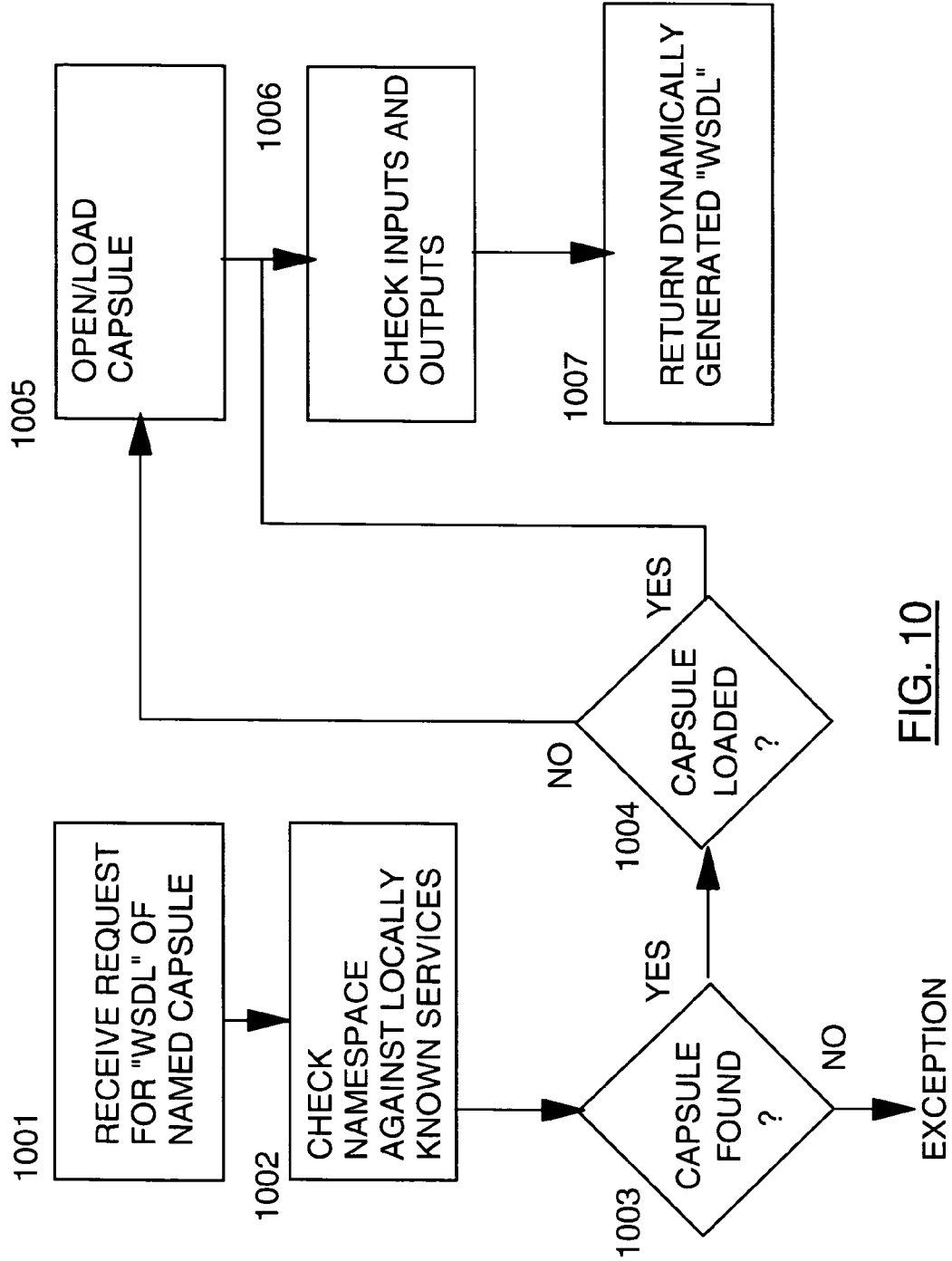
FIG. 10 depicts flows for WSDL generation of a capsule.

WSDL Generation of Web Service Flow FIG. 10. A request for a named capsule "WSDL" is received 1001. The namespace is checked against known services 1002. if no capsule is found 1003, an exception is reported. If a capsule is found but not loaded 1004, it is loaded 1005. An optional check of the capsule outputs and inputs 1006 is performed and dynamically generated "WSDL" is returned 1007.

Figure 11:
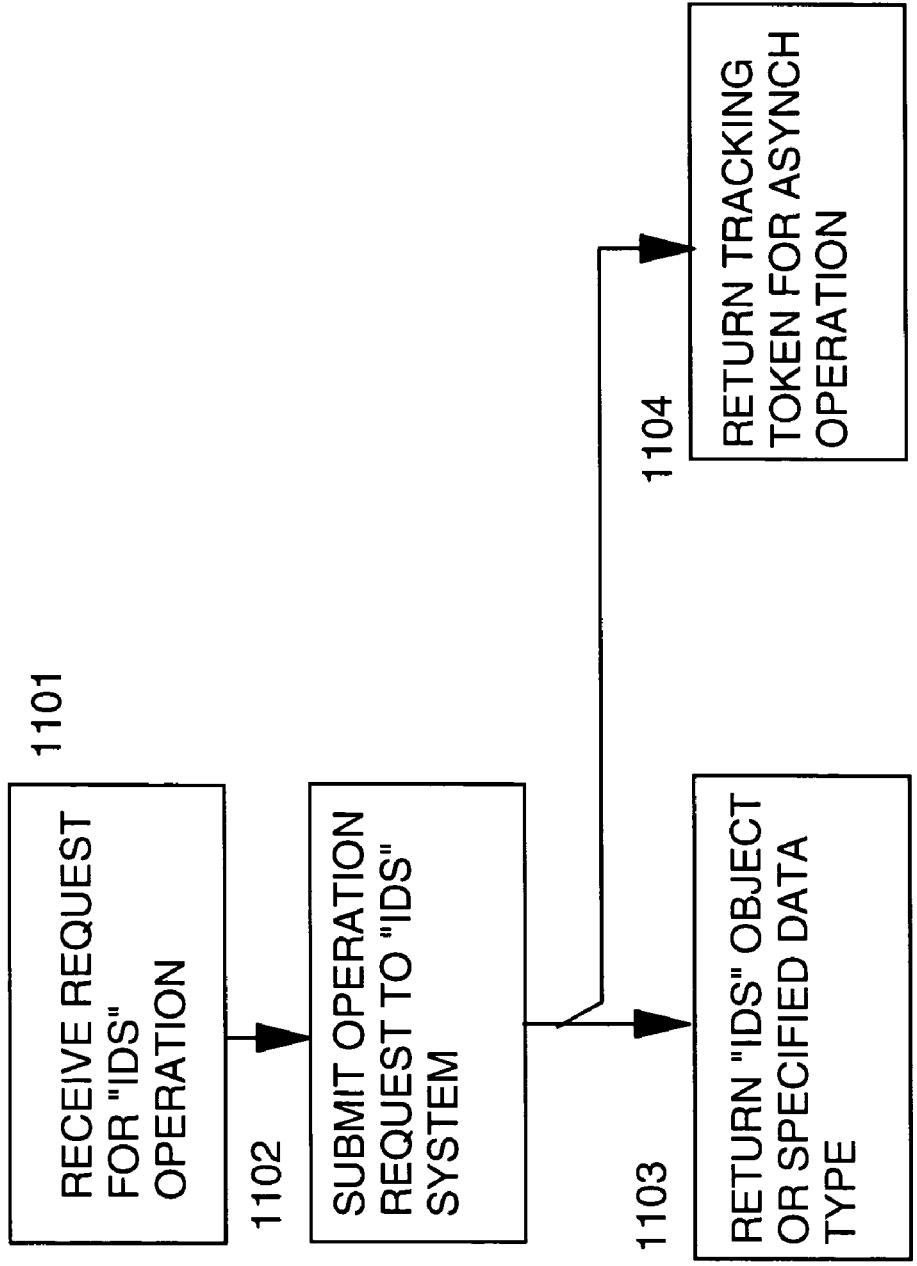
FIG. 11 depicts flows for a SOAP bridge.

IDS Soap Bridge flow is depicted in FIG. 11. A request for "IDS" operation is received 1101. An operation request to the "IDS" system is submitted 1102. An "IDS" object or specified data type is returned 1103 and an optional tracking token for asynchronous operation is returned 1104.

Figure 12:
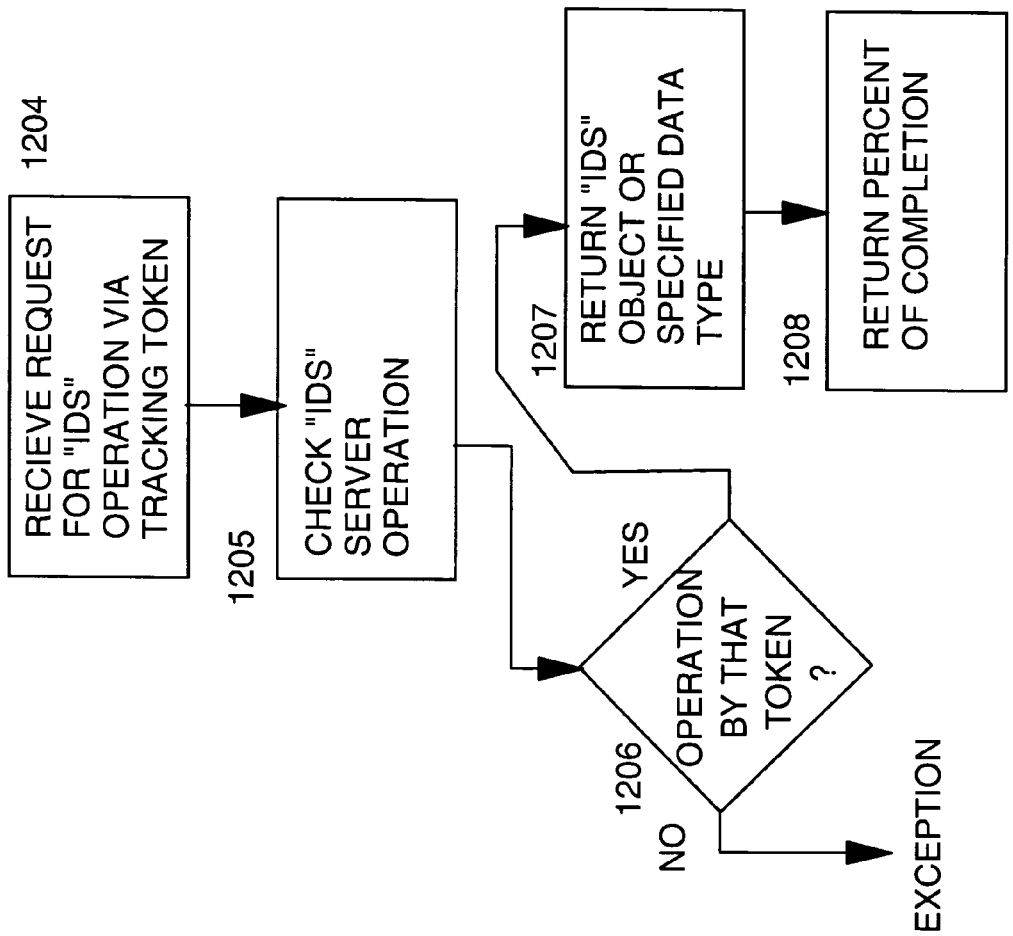
FIG. 12 depicts flows for an IDS request.

Retrieving Asynchronous Requests via ISB is depicted in FIG. 12. A request for "IDS" operation via tracking token is received 1204. The "IDS" server operation is checked 1205. If no operation by that token is permitted 1206, an exception is reported. If operation by that token is permitted, an "IDS" object or specified data type is returned 1207. Optional percent of completion 1108 information is returned.

Several applications of the capsules created according to the present invention are proposed. In one embodiment, a web capsule according to the present invention is invoked by a remote request received via a network protocol, for example, SOAP, RPC, HTTP.

In another embodiment, elements of a capsule do not prevent successful execution of the capsule and/or response to an external request.

In another embodiment, a capsule according to the present invention is integrated to remote applications by providing a WSDL representation to remote applications. Such WSDL can be dynamically generated.

Capsule web services according to the present invention are made up of one or more resources (resources could be other web services, switch/parallel paths and other "built in" functions such as GUI alerting or media playing), which are enhanced by providing a method of invoking capsule flows from external (remote) resources. The following example describes how a remote system/user might interact with the current invention to leverage the web service capsule flow.

A capsule flow is invoked from a remote computer. The remote computer communicates to the host computer using a network protocol. In a preferred implementation the remote computer is able to make a series of "calls" requesting a list of available service capsules and specific details on how to invoke specific capsules or an actual request to invoke a capsule. These "call" transactions are preferably SOAP over HTTP as per open current art standards.

A remote computer queries the capsule environment for a listing of available web service flows. The remote computer preferably sends a general request for all capsules available. This query is optionally more specific, such as requesting only all capsules that start with the letter "A" for example. The response back from the host server is a listing of services that match the initial query. Preferably, this would be done using UDDI queries and responses.

A remote computer in one embodiment queries on a specific capsule hosted in the capsule environment. The remote computer sends a query specifying the specific identifier for the capsule service. The response from the host system is a document that defines the inputs and outputs of the given service capsule in enough detail to make subsequent invocation requests to the host system. Preferably the response uses the WSDL standard to fully describe the capsules expected inputs and outputs.

A remote computer invokes a capsule service flow hosted in a capsule environment. The remote computer specifies the specific capsule service it wants invoked and any parameters needed as specified by the previous call for the service description (WSDL). The response to the invocation request is defined by the service description. In a preferred implementation this transaction uses SOAP over HTTP and WSDL to communicate and describe.

For Example:

Computer A queries Computer B requesting all available services (capsule flows). Computer B responds with a listing of available capsule web service flows. Computer A decides to use Service A on Computer B. Computer A makes the proper call to Computer B invoking the capsule flow (Service A) as a web service. Computer B executes the capsule flow and returns the result to Computer A.

In one embodiment, the web capsule of the present invention is externally integrated and is visually designed, configured and managed at the client side or at the server side.

Remote access to capsules via a web service interface is preferably done using SOAP over HTTP. In a preferred implementation the server mimics the HTTP protocol, responding appropriately to any well formed request. When a message targets a capsule service, the server, returns an error if it is not a properly formatted SOAP message. The message flow of this server is managed via the same drag-and-drop interface used to build capsules.

Figure 13:
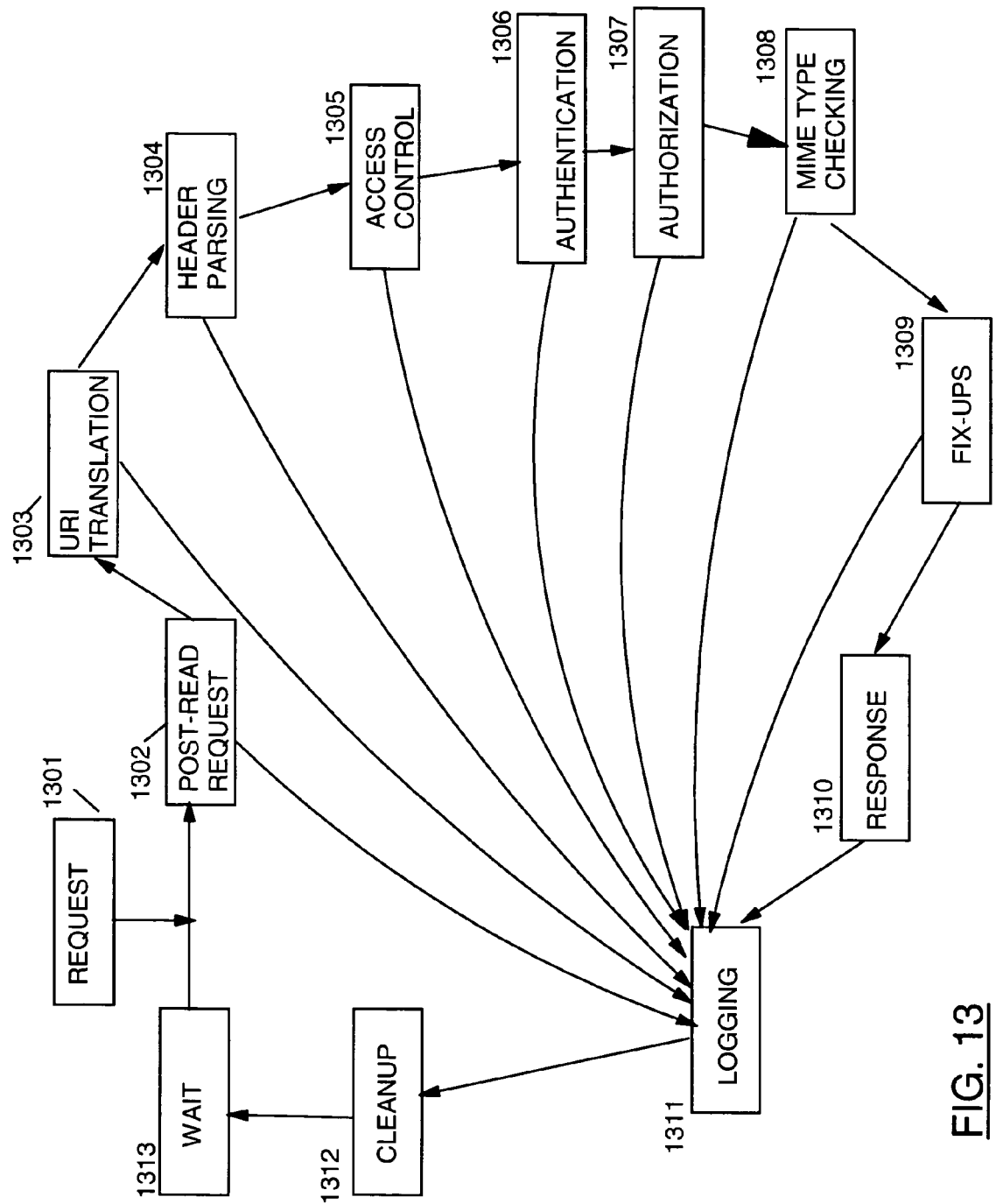
FIG. 13 depicts an example of a server flow.

FIG. 13 represents a Server Event Flow. It is an example of how servers often have a series of steps that need to be fulfilled to generate a response. Servers or flows like this one are able to leverage the capsule concept to provide high customizability and flexibility.

Referring to FIG. 12, the following set of events describes a simple HTTP server flow; receive message 1302, parse message 1304, check for requested resource, respond to message 1310. Of course, any event flow can be managed using the capsule desktop as defined by Rogers et al. One of the drag-and-drop modules provided might be an authentication handler. In a preferred embodiment, the server flow receives a request message, decodes it, checks to make sure the resource exists and then responds to the request. It is desirable to restrict access to certain requests. Dragging and dropping an authentication handler (module) into the flow would provide this functionality. The flow becomes: receive request 1302, parse message 1304, check authentication 1306, check resource 1308 and then respond 1310. The flow could also have been done in a different order: receive request, parse, check response, check authorization and then respond. Moreover, check authorization and check resource could process in parallel if desired. The response module 1310 would simply take, as input, the results of the two "check" modules to determine the appropriate response.

As shown in FIG. 12, a request 1301 is processed and becomes a post-read request 1302. The request is translated 1303 and the header is parsed 1304. After the access control 1305, authentication 1306 and authorization 1307 is checked. The file mime type is checked and the results pass through the Fix-up stage. The response 1310 is sent to the request 1301 and logged 1311. Cleanup is performed 1312 and the system waits 1313 for a new request. At each stage, the progress is logged 1311 as shown.

In one embodiment, the web capsule is run in a remote machine. The other machine is clustered or grid enabled.

In one embodiment, having created a web service capsule according to the present invention, the capsule is executed on remote capsule enabled servers. A user drag and drops the capsule onto an area of the capsule desktop to enable a network connection. Drag and drop is only one way to initiate the network connection. It is also possible to simply create a network connection and issue the request.

The communication from the local desktop to a remote server involves a network connection to one or more servers using a network protocol. In the preferred implementation this network connection would use SOAP over HTTP.

Remote servers are individually represented or ganged up as a generic "server ether". The user drag and drops a selected capsule flow onto an icon representing either one of the individual remote servers or a clustered grouping. This initiates a network request to process the web service capsule. In a preferred implementation a clustered grouping randomly chooses a server on which to execute, or optionally executes the capsule on each of the servers.

The capsule is then sent to the remote server(s) for execution. In a preferred implementation the capsule is described in an XML message that includes the identity of the necessary components and which web services to invoke, where the web services can be found, and in what order they are to be invoked and which results are passed to which web services.

In one embodiment, the result is the result of the last executed service in the flow. This is similar to what a remote access to a capsule would be like. In another embodiment, the result may be a document that captures every request and response message of the flow so that the events can literally be played back on the local machine. In a preferred implementation the latter response is also encoded in XML and contains raw SOAP envelopes with time encoding to accurately capture remotely executed flows.

Figure 14:
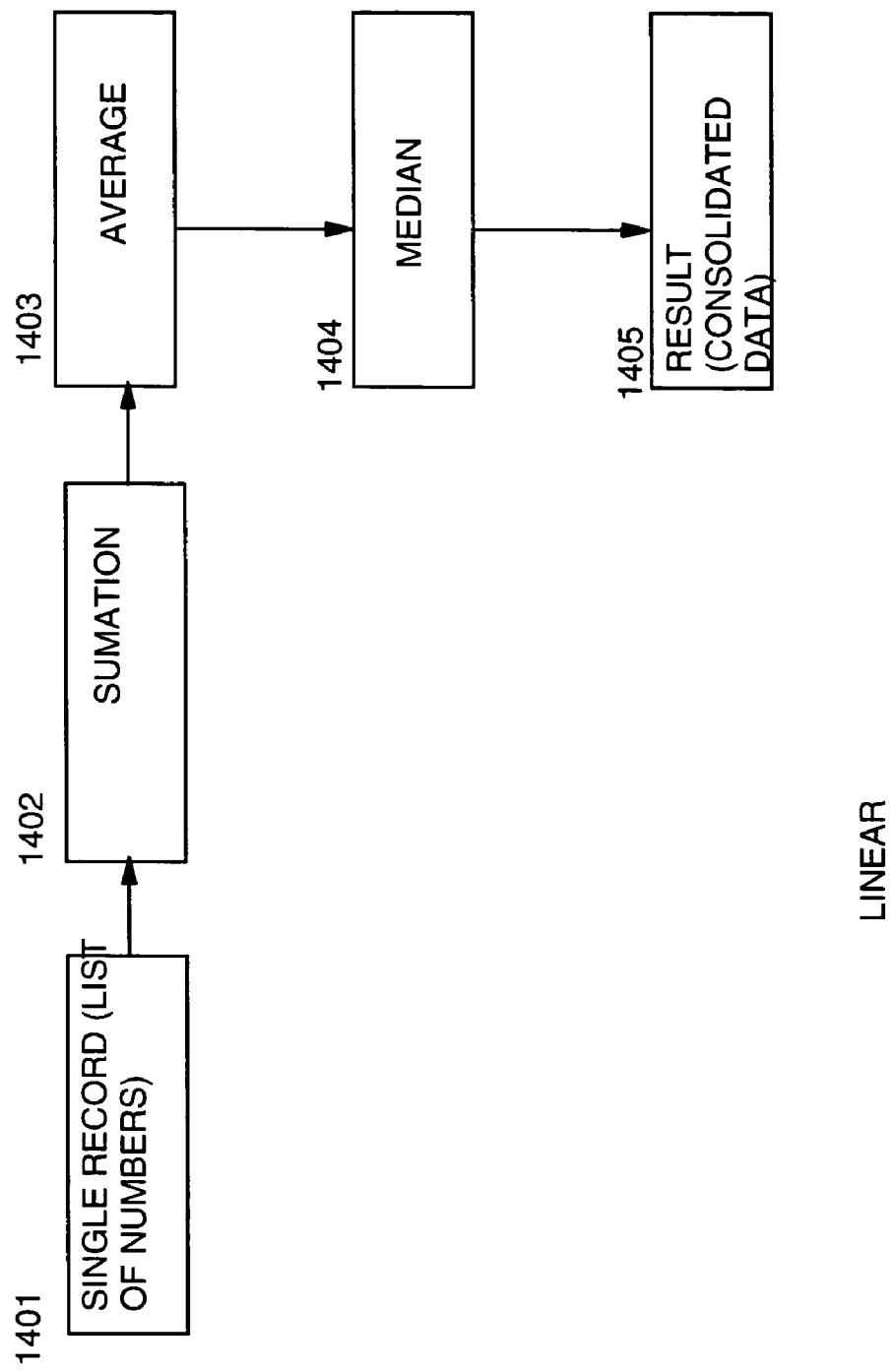
FIG. 14 depicts a linear flow.
Figure 15:
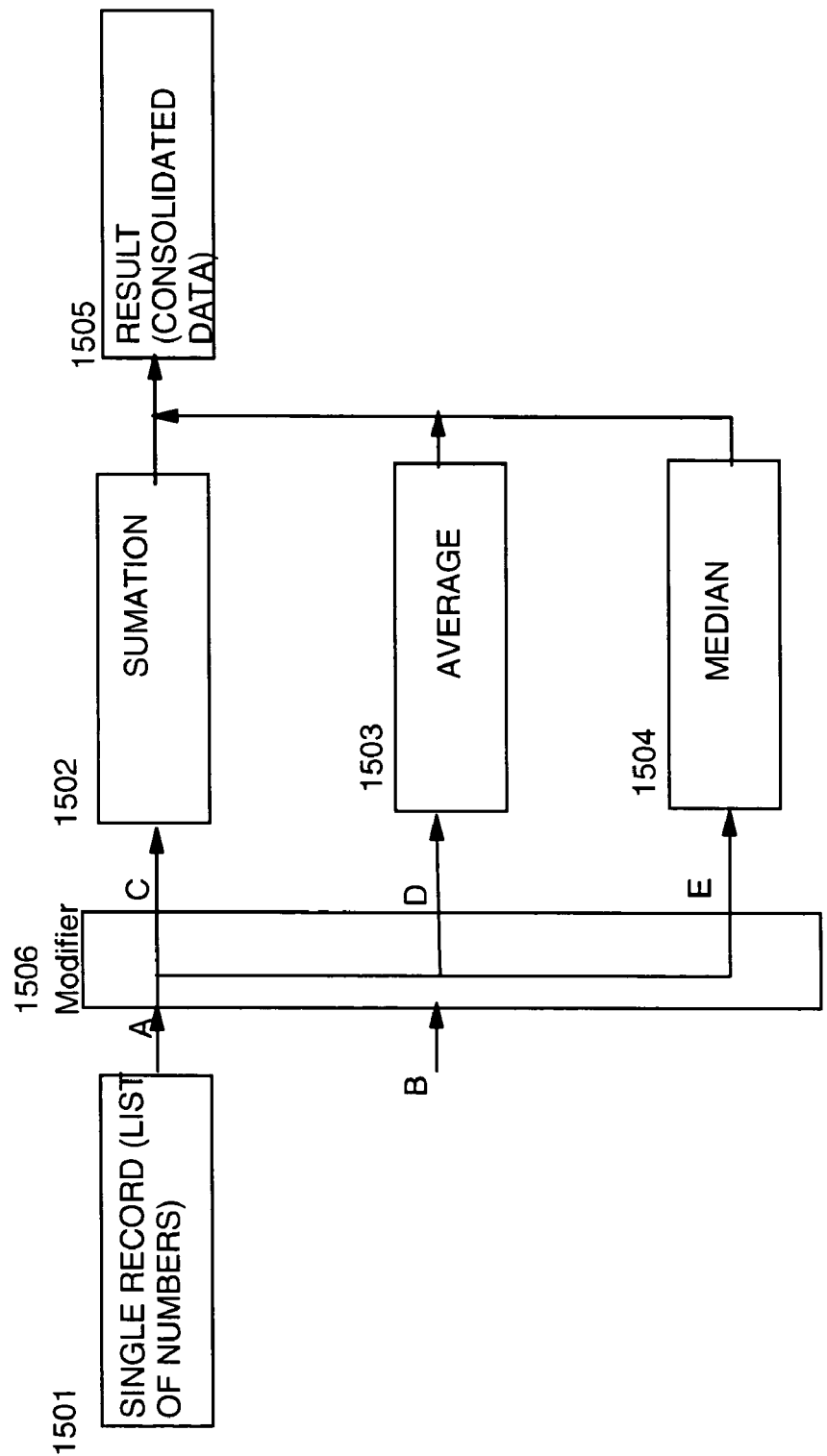
FIG. 15 depicts a single record flow with parallel execution with tasks on different computers.

Web service flows in one embodiment are executed serially (Shown in the Capsule in FIG. 14). A single record 1401 supplies information to a summation icon 1402, then an average icon 1403 and finally a median icon 1404 and the results are provided by the result icon 1405. Each icon is personalized to perform a desired function including "null" which passes the record on to the next stage.

Web service flows in one embodiment are executed in parallel. This function is provided by capsule modifiers.

Figure 18:
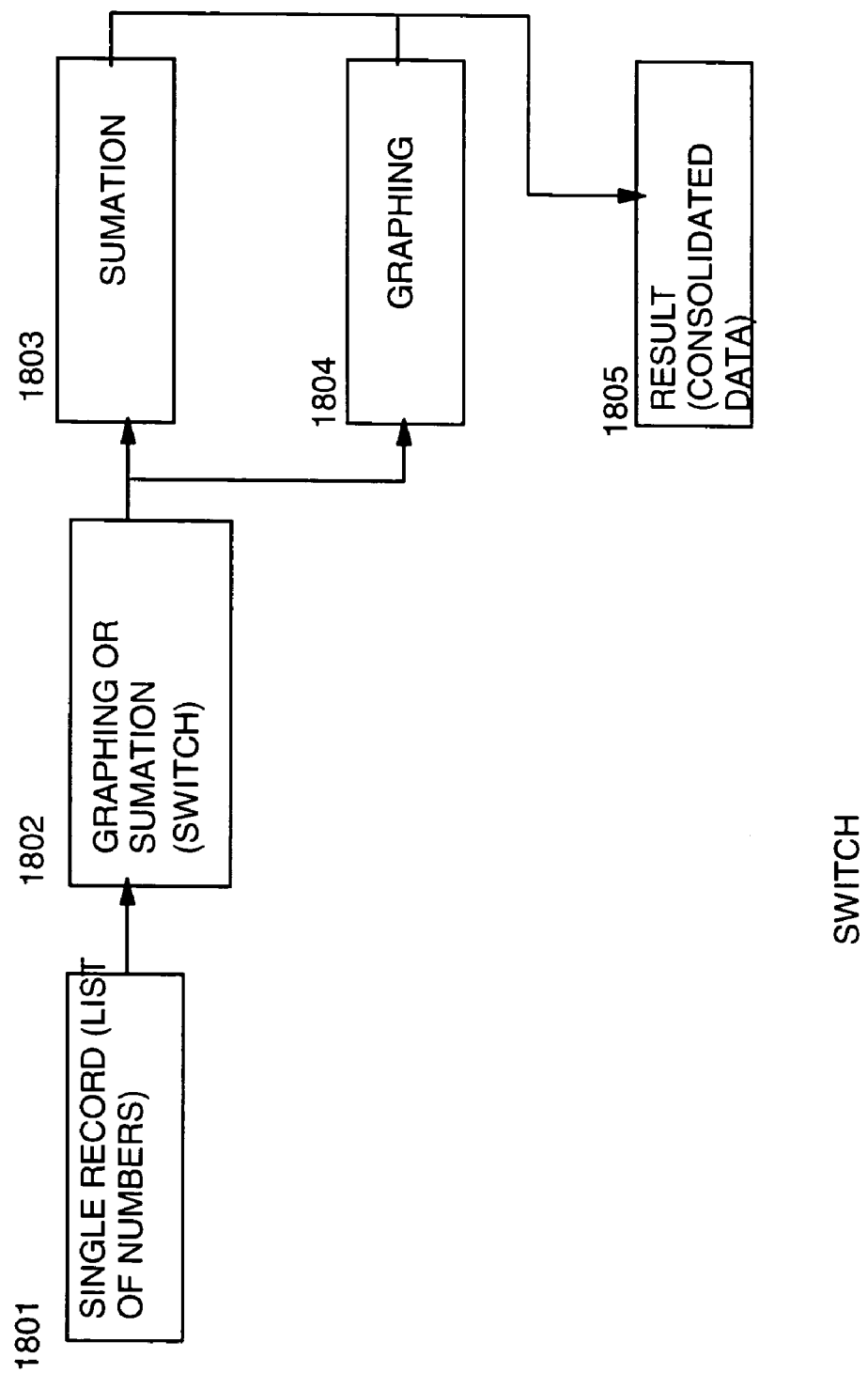
FIG. 18 depicts a flow with a switch operator.

In one embodiment FIG. 18, a switch modifier 1802 is provided. The switch modifier 1802 checks a given variable or state of events to determine on which path to continue execution. For example: The result of a web service call is one of three different values. Depending on the value of this call different paths of execution are followed. For example, result A branches to the first path, result B branches to the second path and result C follows the third path. There are other possibilities and the invention is by no means limited by this example. In the example of FIG. 18, the record is provided 1801 to a switch 1802 that determines whether to perform a graphing or summation operation. The switch then sends the message to either the summation icon 1803 or the graphing icon 1804 (or both) according to the switch 1802 personality. The results are consolidated 1805 and reported.

In one embodiment, a parallel execution modifier is provided (FIG. 14). Given a single web service call 1501, multiple parallel paths maybe followed. The result of one or more paths is then assimilated 1505, either through another web service call/capsule or via a data normalizer. A data normalizer takes multiple data inputs and formats it in a usable way. For example: if the sum 1502, median 1504 and average 1503 are taken of a set of data, all calculated in parallel, a preferred normalizer 1505 is configured to only save the lowest number. In another example: the results 1506 from all the paths are stored as the final result of the service call. In a preferred implementation this result 1506 is an XML document representing the data structure as defined by the results of the capsule flows. In a preferred implementation either of the above modifiers follow the pattern of other widgets provided by the capsule environment, such as an alert dialog.

Figure 16:
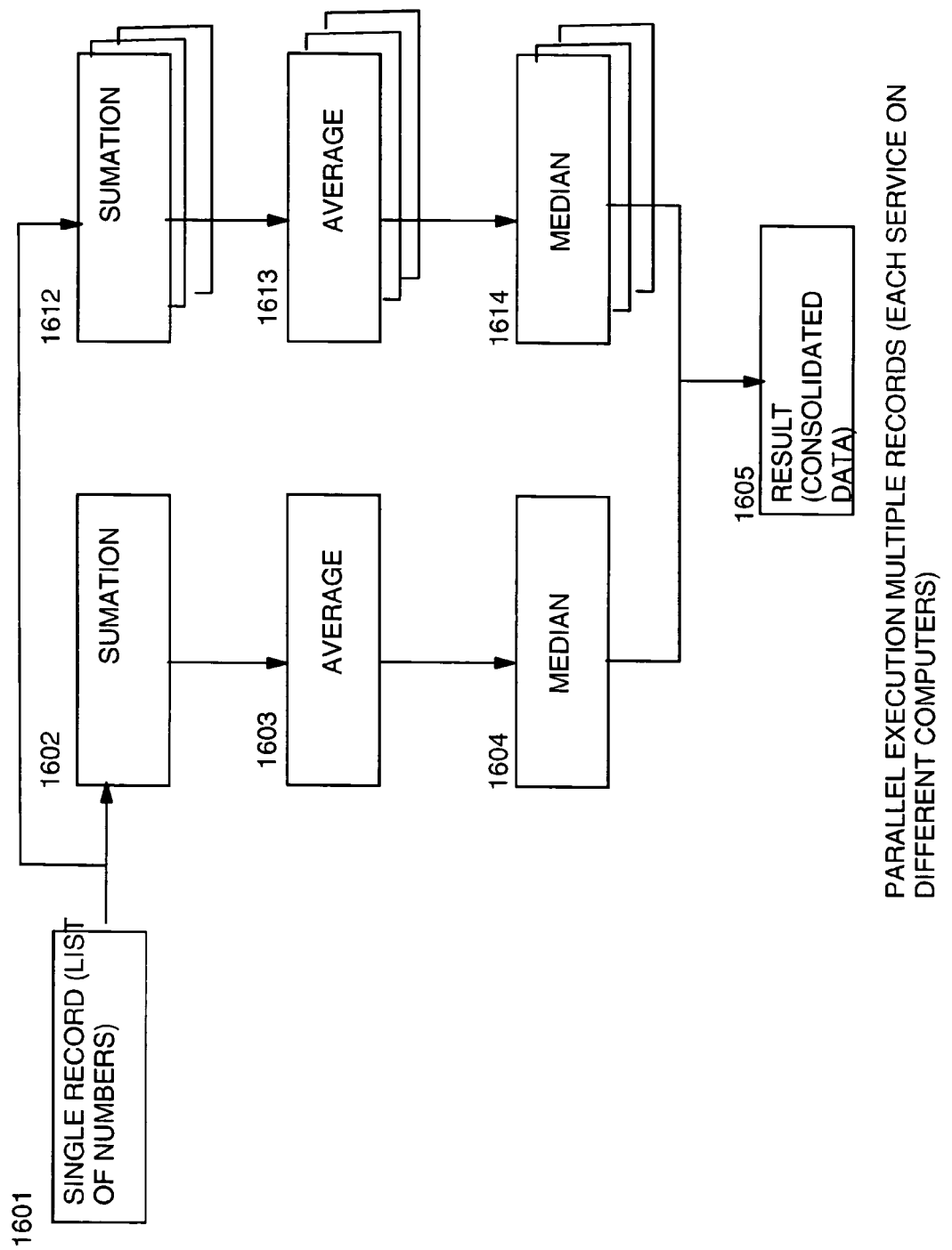
FIG. 16 depicts a multi-record flow with parallel execution with tasks on different computers.
Figure 17:
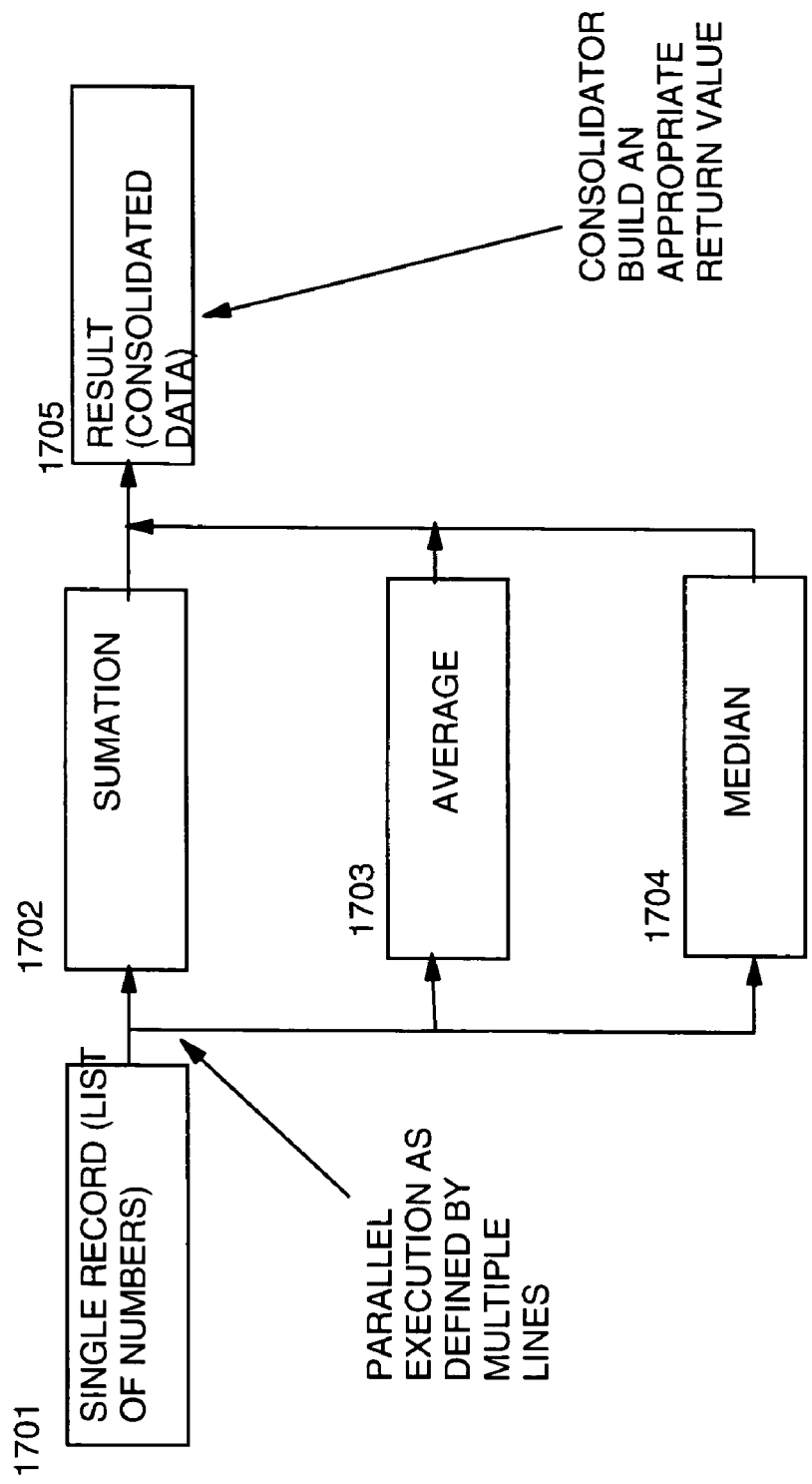
FIG. 17 depicts a parallel flow.

In another embodiment FIG. 16, a record 1601 can be executed serially (Summation 1602, average 1603, then median 1604) by any of several paths in parallel with other records executed serially in another of the paths (Summation 1612, average 1613, then median 1614).

In another embodiment, parallel execution of a record 1701 is indicated by providing multiple interconnect lines to the parallel icons 1702 1703 1704 and the result is consolidated 1705 by connecting the output of the parallel icons to the result icon 1705.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A method for creating a first computer program at a first computer system in a web services environment, the method comprising the steps of:

responsive to a GUI (graphical user interface) user Drag and Drop operation on a GUI display on any one of the first computer system or a remote computer system moving a first representation of a first web service program into a common storage partition of the first computer system, the first web service program stored at a second computer system remote from the first computer system;

responsive to a GUI user Drag and Drop operation on the GUI display, moving a second representation of a second program into the common storage partition of the first computer system;

responsive to a GUI user Drag and Drop operation on the GUI display, interconnecting the first representation of the first web service program with the second representation of the second program in the common storage partition of the first computer system wherein the first web service program and the second program cooperate to perform a desired function by way of the interconnection;

responsive to a GUI user Drag and Drop operation on the GUI display, saving to the common storage an interconnected representation of the first web service program and second representation of the second program as a first encapsulated program;

responsive to a GUI user Drag and Drop operation on the GUI display, saving to the common storage identifying information identifying the first encapsulated program;

saving to the common storage invoking information for invoking the first encapsulated program, wherein any one of the identifying information or the invoking information is dynamically generated; and providing the identifying information and invoking information to a third computer system remote from the first computer system.

2. The method according to claim 1 wherein the storage of any one of the saving to storage steps is any one of local storage or remote storage.

3. The method according to claim 1 wherein the identifying information further comprises descriptive information describing function of the first encapsulated program.

4. The method according to claim 1 wherein the first encapsulated program comprises a web service program.

5. The method according to claim 1 wherein any one of the identifying information or the invoking information are provided in WSDL.

6. The method according to claim 1 wherein the identifying information and invoking information is provided to the third computer system in a list of a plurality of encapsulated programs.

7. The method according to claim 1 comprising the further steps of:
receiving a call request from a remote computer system, the call request invoking the first encapsulated program as a web service;
executing the first encapsulated program; and
returning results of the execution of the first encapsulated program to the remote computer system.

8. The method according to claim 7 wherein the call request is received by way of any one of a local application interface or a network protocol, the network protocol comprising any one of Soap, RPC, hyper-sockets or HTTP.

9. The method according to claim 1 wherein the encapsulated program is any one of visually designed, visually configured, visually managed or visually created using GUI techniques.

10. A method for creating a first computer program at a first computer system in a web service environment, the method comprising the steps of:
responsive to a GUI user Drag and Drop operation on a GUI display on any one of the first computer system or a remote computer system, moving a first representation of a first web service program into a common storage partition of the first computer system, the first web service program stored at a computer system remote from the first computer system;

responsive to a GUI user Drag and Drop operation on the GUI display, moving a second representation of a second program into the common storage partition of the first computer system;

responsive to a GUI user Drag and Drop operation on the GUI display, moving a modifier representation of an interconnection function into the common storage partition of the first computer system;

responsive to a GUI user Drag and Drop operation on the GUI display interconnecting the first representation of the first web service program with the second representation of the second program in the common storage partition of the first computer system wherein the first web service program and the second program cooperate to perform a desired function by way of the interconnection;

responsive to a GUI user Drag and Drop operation on the GUI display, interconnecting any one of the first representation or the second representation with the modifier representation wherein the interconnecting determines an in out to output path through the modifier wherein the path is determined b a value of an input to the modifier; and responsive to a GUI user Drag and Drop operation on the GUI display, saving to common storage an interconnected representation of the first web service program and second representation of the second program as a first encapsulated program.

11. The method according to claim 10 wherein the interconnection function comprises any one of a parallel execution connection, a serial execution connection, a data normalizer function, an algebraic function, a Boolean function, a one to many interconnection function, a many to one interconnection function, a many to many interconnection function, a switching function, a filtering function, or a monitoring function.

12. The method according to claim 10 wherein the interconnection function determines an input to output path according to predetermined criteria.

13. The method according to claim 10 wherein the storage of the saving to storage step is any one of local storage or remote storage.

14. The method according to claim 10 wherein the first encapsulated program comprises a web service program.

* * * * *